United States Patent [19]
Millet

[11] 3,777,644
[45] Dec. 11, 1973

[54] CAMERA COCKING MECHANISM
[75] Inventor: Marcus J. Millet, New York, N.Y.
[73] Assignee: Eastman Kodak Company, Rochester, N.Y.
[22] Filed: May 10, 1972
[21] Appl. No.: 252,041

[52] U.S. Cl............................. 95/31 AC, 95/31 FL
[51] Int. Cl. .......................................... G03b 19/04
[58] Field of Search .................... 95/31 FL, 31 AC, 95/31 R

[56] References Cited
UNITED STATES PATENTS
2,880,661   4/1959   Kaden et al. ...................... 95/31 AC
3,641,897   2/1972   Fujimoto........................... 95/31 FL
3,646,862   3/1972   Von Sybel......................... 95/31 FL
3,673,941   7/1962   Williams........................... 95/31 AC Primary Examiner—Samuel S. Matthews
Assistant Examiner—E. M. Bero
Attorney—W. H. J. Kline et al.

[57] ABSTRACT

A camera mechanism for cocking a shutter includes a rotating disc having a spiral groove on one face and spaced notches about its periphery. A movable arm has a follower at one end adapted to follow in the spiral groove, and the other end is coupled to the camera shutter assembly to cock the shutter as film is advanced. The follower moves in a slot provided on a guide member.

5 Claims, 5 Drawing Figures

CAMERA COCKING MECHANISM

BACKGROUND OF THE INVENTION

1. Field of the Invention

The present invention relates to camera cocking mechanisms.

2. Description of the Prior Art

Ease of operation is an increasingly important camera feature, particularly for cameras directed to the popular market. Accordingly, in the development of new cameras, considerable stress is placed on minimizing the number and complexity of operations to be performed by the camera user. Unfortunately, the possibilities for such increased user convenience often involve some sacrifice in picture taking flexibility. Therefore, a particularly attractive area for simplification exists among the routine preparatory picture taking operations which have no affect on the quality of the photograph. One such simplification is realized by combining the film metering and shutter cocking functions.

Where roll film is used, provision must be made for film advance to allow the individual exposure frames to be sequentially positioned in registration with the framing aperture of the camera for the recording of scenes. Early cameras required the camera user to align indicia printed on the film backing with a window disposed in the camera back in order to properly position the individual exposure frames. Later forms of roll film include perforations located at predetermined metering intervals. To assure proper exposure frame registration and minimize requirements for operator attention, cameras have been adapted to automatically sense the perforations and to arrest film advancement when the succeeding frame in the exposure sequence is properly positioned. Further film advancement is typically prevented by a latching mechanism, coupled to the shutter assembly, which releases only after an exposure operation has been completed thereby preventing inadvertent film waste.

For cameras employing shutters adapted to be cocked preparatory to actuation, user convenience is served if the shutter is energized through a coupling with the film advance mechanism. Gradual energization is desirable both from structural considerations and to provide a more uniform film advance stroke than would result with an abrupt energy transfer. In evaluating operator characteristics relative to film advance mechanisms, it has been observed that smooth action and a "solid feel" consistent with that expected of a properly functioning machine are significant characteristics in fostering operator confidence and satisfaction. Conversely, sudden changes in resistance to movement give a sensation of slipping or jamming so as to undermine user confidence, and are accordingly undesirable for example may cause the operator to cease film advance prior to latching of the film advance mechanism.

Considering the devices presently available, the need exists for a mechanism combining film metering and shutter cocking which is smooth in operation, provides rugged and positive film advance control, and allows substantial design flexibility.

SUMMARY OF THE INVENTION

Accordingly, it is an object of the present invention to provide improved apparatus for energizing a camera shutter drive mechanism in response to operation of the camera film advance mechanism.

It is a further object of the present invention to provide gradual energy transfer from the camera film advance mechanism to the camera shutter assembly by providing a coupling linkage therebetween which includes a spiral cam surface controlling the energy transfer.

In a preferred embodiment of the present invention, a mechanism for cocking a camera shutter employs a disc coupled to rotate with the film advance mechanism. The disc is formed with a notched periphery and with a spiral groove on one face thereof. A movable arm, having a follower or lug at one end adapted for following in the spiral groove during initial film advance, is coupled to the camera shutter assembly. With rotation of the disc, the arm is caused to move through an operative cycle cocking the shutter. A latching member movable to engage the notched periphery of the disc and thereby latch the film advance is coupled to a film perforation sensor and acts responsive thereto to control the metering of film.

The invention, and its objects and advantages, will become more apparent in the detailed description of the preferred embodiments presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Because photographic cameras are well known, the present description will be directed in particular to elements forming part of, or cooperating more directly with apparatus in accordance of the present invention. It is to be understood that camera elements not specifically shown or described may take various forms well known to those skilled in the art.

Figure 1:
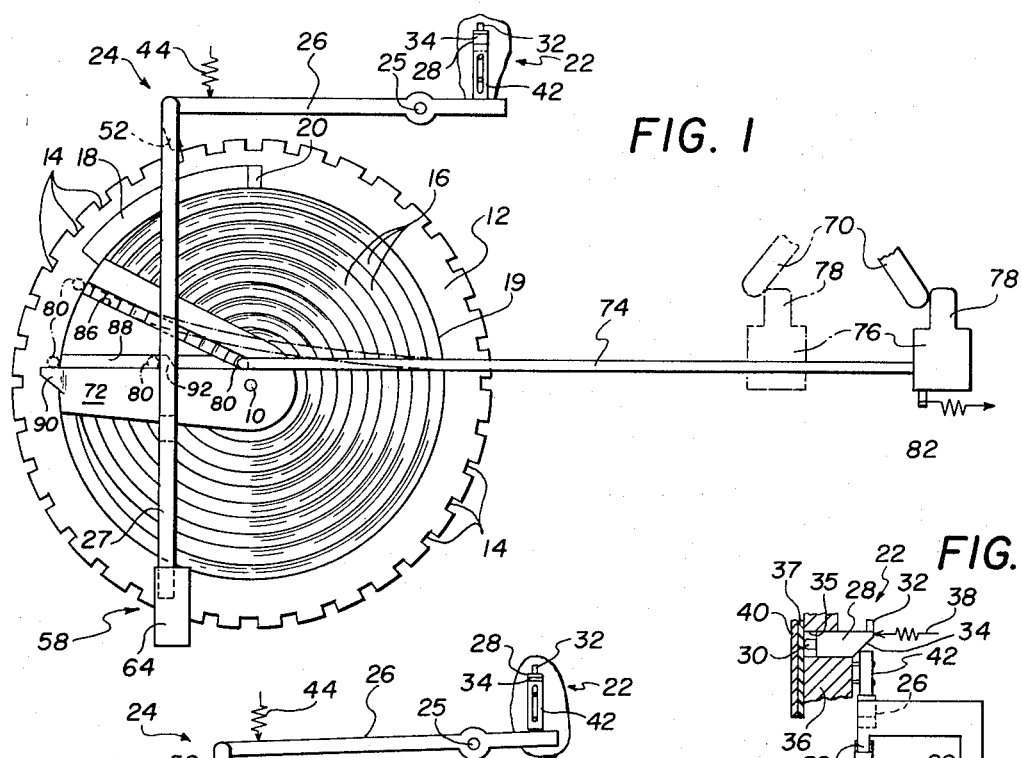
FIG. 1 is a schematic view of a portion of a camera in accordance with the preferred embodiment of the present invention as seen after a film exposure operation and before the film is advanced.

FIG. 1 shows a mechanism embodying a preferred embodiment of the present invention. A shaft 10 interconnects an advance member such as a knob or motorized film advance and the camera's take-up spool. Neither the advance member nor the take-up spool is shown, and they may take any of the many forms known in the art. A disc 12 is mounted to rotate with shaft 10 in a counterclockwise direction as viewed from FIG. 1 as film is being advanced in the camera. Disc 12 includes a series of spaced, peripheral indentations or notches 14, a spiral groove 16 on one of its radial faces and a ramp 18 projecting from the disc face adjacent to the spiral groove. Spiral groove 16 is preferably cut or molded into a raised portion 19 formed on the disc face (see FIG. 3) and spirals outwardly from the disc center in a clockwise direction. Ramp 18 is positioned to serve as a continuation of the path of groove 16 and the ramp rises from the disc face to terminate in a level platform portion 20 (see FIGS. 1 and 3).

Film Metering

The registration of individual exposure frames within the exposure aperture of the camera is controlled by a metering assembly comprising a perforation sensor generally denoted 22 and a metering member 24 pivotably mounted at 25 and having a pair of legs 26 and 27. The metering assembly is intended for use with perforated strip film having a series of exposure frames and arranged in a row with each perforation disposed in predetermined relationship to an individual exposure frame.

Figure 5:
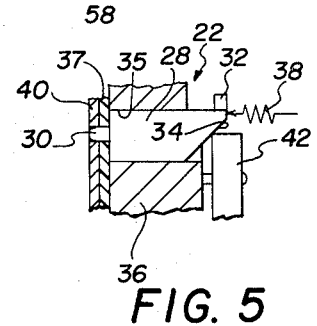
FIG. 5 is a view to an enlarged scale of a detail of FIG. 3 after the film has been fully advanced.

Perforation sensor 22 is best seen in the enlarged view of FIG. 5 and comprises a body portion 28, a sensing pawl 30, a retracting stud 32, and a ramp surface 34. Body portion 28 is slidably mounted in an aperture 35 in a wall 36 of the film compartment and is biased toward film 37 by such means as a spring 38 to engage the film. The film may be backed by paper 40.

Figure 3:
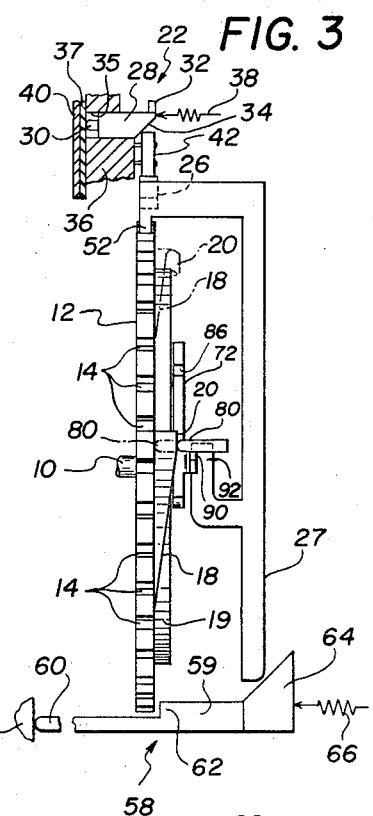
FIG. 3 is a left side view of the camera elements of FIG. 1 illustrating the elements in their positions during the last stage of film advance when shutter cocking is completed.

When film is transported to a position to locate a perforation in alignment with sensing pawl 30, the sensing pawl enters the perforation under the urging of spring 38, thereby effecting a displacement of sensor 22 from its position shown in FIG. 3 to its position shown in FIG. 5. Backing paper 40 may also be perforated so that sensor 22 may enter further into the film. Sensor 22 is disposed along the film path in relation to the camera framing aperture (not shown) a distance equivalent to that between a film perforation and the corresponding exposure frame. Consequently, when the sensing pawl enters a perforation, the corresponding exposure frame is positioned in registration with the framing aperture. Movement of the sensor 22 to its FIG. 5 position thus occurs when an exposure frame is in registry with the framing aperture.

Metering member 24 includes a slide member 42 which follows the camming movement of ramp surface 34 of sensor 22. Linkage 26 is urged in a counterclockwise direction about pivot 25 by a spring 44 to bias the slide member 42 against cam surface 34.

Figure 2:
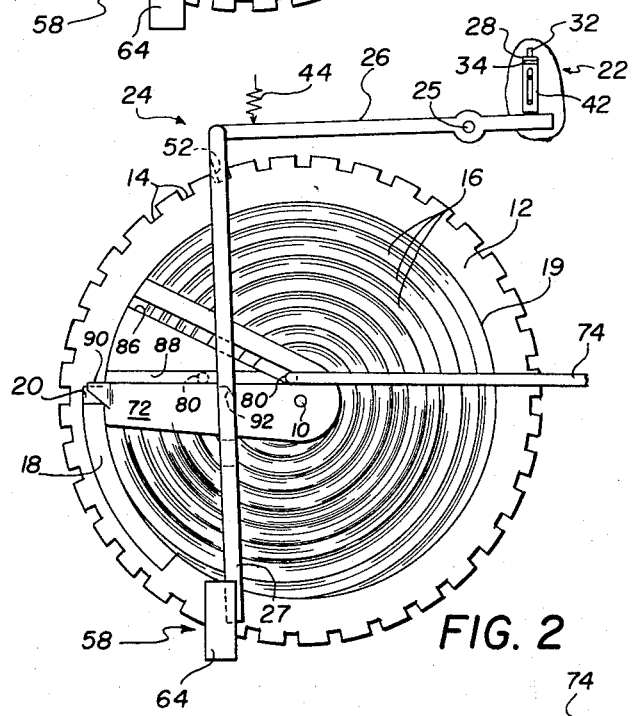
FIG. 2 is a view similar to FIG. 1 but illustrates the positions of the camera elements after film advance is completed.

As seen best in FIG. 3, metering member 24 carries a latching lug 52 aligned with notches 14 in disc 12. When metering member 24 is in its position shown in FIGS. 1 and 3, lug 52 is spaced from disc 12, while when the metering member is in its FIGS. 2 and 5 position, lug 52 enters one of notches 14 to prevent rotation of disc 12 and further advancement of film 37.

Lock-up Device

A desirable compliment to automatic film metering control is a provision for locking-up the film advance mechanism responsive to opening of the camera film compartment door. This feature is conveniently provided by including a lock means 58 whch comprises a member 59 having a door sensing extension 60, a latch portion 62 and a ramp portion 64. Lock means 58 is mounted for substantially front to rear sliding movement in the camera and is urged rearwardly by a spring 66. Two positions, a retracted position and a latch position, are defined for door responsive latch 58. In the retracted position, which is assumed with the film door closed, sensing extension 60 abuts against a portion 68 of the closed film door, latch portion 62 and ramp portion 64 being held out of engagement with the operative camera mechanisms. For the latch position, door responsive member 59 is moved rearwardly by spring 66 and door sensing extension 60 protrudes into the film door aperture. Hence, the latch position is achievable only with the film door open. In the latch position, projecting latch portion 62 engages disc 12 and enters the first notch coming into alignment therewith to positively latch the disc and consequently arrest the film advance.

When inserting a new cartridge, it is desirable that sensing pawl 30 not bear against the film surface with the full force of springs 38 and 44. Ramp portion 64 of door responsive latch 58 bears against the lower end of leg 27 to rotate metering member 24 in a clockwise direction (as viewed in FIG. 1) against the force of spring 44 whenever camera door 68 is opened. This leaves pawl 30 loaded only by spring 38 so that the film and backing paper of a cartridge being inserted are not required to overcome the force of spring 44.

Shutter Cocking

The shutter cocking mechanism described in the preferred embodiment is energized preparatory to scene recording by mechanical means such as a cocking lever 70. Cocking lever 70 is movable from a rest position (shown in full line in FIG. 1) to a cocked position (phantom line) for energizing the shutter which may take various forms known in the art.

Cocking of the camera shutter is accomplished by a cocking assembly cooperating with disc 12, the cocking assembly comprising guide means such as guide plate 72, a flexible arm 74 and a cocking motion transfer slide 76. Cocking motion transfer slide 76 is movable from a rest position along an operative path to transmit cocking motion through a transfer finger 78 to a cocking lever 70. Flexible arm 74 is rigidly connected to the cocking motion transfer slide 76 and extends in front of disc 12 to terminate in a follower lug 80 which projects through plate 72 to the disc face. The slide 76 and connecting arm 74 are biased to the rest position (shown in FIG. 1) by a spring 82. Arm 74 may of course be inflexible and pivotally mounted to slide 76.

A cocking path or track (shown by arrows 84 in FIG. 4) for follower lug 80 is defined by guide plate 72 in cooperation with disc 12. The guide plate 72 is fastened within the camera body at a location immediately in front of disc 12 and extends to cover the sector of the grooved disc face which is away from cocking lever 70 (see FIGS. 1 and 4). Two converging portions of the cocking track are defined by an elongate slot 86 and a groove 88. Slot 86 allows access to spiral groove 16 while groove 88 does not extend through plate 72.

Figure 4:
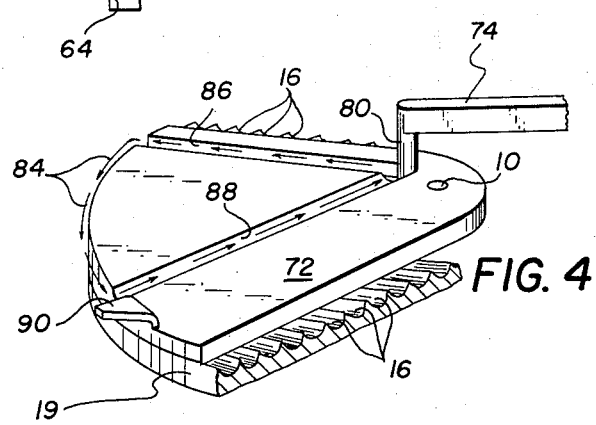
FIG. 4 is a perspective view partially cut away of some of the camera elements shown in FIG. 1.

During film advance, rotation of disc 12 moves follower lug 80 from the point intersection of slot 86 and groove 88 outwardly along slot 86 (as shown by arrows 84 in FIG. 4). This motion is transmitted by cocking motion transfer slide 76 to cocking lever 70 to move the cocking lever to its cocked position and to thereby effect cocking of the shutter. Now follower lug 80 is carried by disc 12 along the arcuate outer edge of guide plate 72 until arrested by a stop 90 which is rigidly fastened to guide plate 72. Continued rotation of disc 12 brings ramp 18 under lug 80 until platform 20 is reached (see FIG. 3). Now lug 80 is at the level of groove 88 so that the groove can receive follower lug 80 from platform 20 for return to the rest position. It will be seen from the foregoing that the cocking track 84 is a closed path with movement by the follower lug 80 around the track coupled to the shutter cocking lever 70 by flexible arm 74 and cocking motion transfer slide 76.

Passage of follower lug 80 along groove 88 is controlled by a blocking arm 92 (FIG. 3) which extends from leg 27 to block the return of the follower lug to its rest position when the film advance is not latched. Specifically, with the metering member 24 in the raised position, blocking arm 92 extends to block motion of follower lug 80 at a point along the cocking track. When metering member 24 moves to the latch position, blocking arm 92 is lowered away from the cocking track and consequently does not block lug 80. As will be discussed more fully in the description of the operation of the metering mechanism set forth hereinbelow, metering member 24 returns to the latch position only at the end of a frame advance and the control exercised by blocking arm 92 serves to prevent follower lug 80 from returning to the rest position to begin a second travel around the cocking track during a frame advance.

Operation

Operation of the illustrated embodiment will now be described beginning from the point in the camera operational sequence immediately following an exposure. Referring to FIG. 1, the starting positions of the elements are shown in solid lines. Perforation sensor 22 is initially held in its retracted position by the film to hold metering member 24 in its raised position against spring 44. As the camera operator actuates the film advance, directly coupled shaft 10 is rotated causing a corresponding rotation of disc 12, causing follower lug 80 to travel around the cocking track until it engages blocking arm 92, thus cocking the shutter.

As the next film exposure frame is advanced into registry with the camera's framing aperture, the perforation corresponding thereto comes into alignment with sensor pawl 30 which is thus enabled to move to the signal position (see FIG. 5) under the urging of spring 38. With sensor 22 moved to its FIG. 5 position, linkage 26 is permitted to pivot in the counterclockwise direction under the urging of spring 44, causing lug 52 to enter one of the notches 14 in disc 12, thus latching disc 12 and thereby preventing further film advance. As lug 52 moves toward disc 12, blocking arm 92 moves from the path of follower lug 80 to allow lug 80's return to slot 86 under the urging of spring 82. From the foregoing it is seen that, at this point in the operational sequence, the shutter cocking is completed and a new exposure frame is positioned for scene recording.

Actuation of the camera release lever (not shown) by the user trips the shutter, recording the scene and causing cocking lever 70 to return to the rest position. The camera release lever may be, on the return stroke, coupled to retracting stud 32 and moves sensor 22 to the retracted position forcing slide member 42 downwardly. This motion transmitted through linkage 26 drives metering member 24 to the raised position freeing disc 12 and consequently the film advance. A full operational sequence is thus performed in the foregoing manner.

The invention has been described in detail with particular reference to a preferred embodiment thereof, but it will be understood that variations and modifications can be effected within the spirit and scope of the invention.

I claim:

1. In a roll film camera having a film advance mechanism operable to index successive frames of film to the camera exposure station and a shutter mechanism movable from a cocked position to a run-down position to expose a frame of film at said exposure station; an improved device for moving said shutter mechanism to its cocked position upon operation of said film advance mechanism, said device including:
   a rotatable member having a spiral cam surface defined thereon;
   means interconnecting said member and said film advance mechanism for rotating said member upon operation of said film advance mechanism;
   a guide member having a slot therein;
   follower means extendable through said slot for engaging said spiral cam surface, said follower means being movable from a first position to a second position by said cam surface upon rotation of said rotatable member;
   means interconnecting said follower means and said shutter mechanism for moving said shutter mechanism to its cocked position upon movement of said follower means to its second position; and
   means for guiding said follower means from its second position to its first position without said follower means engaging said spiral cam surface.

2. The improvement as defined in claim 1 wherein said spiral cam surface is defined on a planar surface of said rotatable member, said planar surface being perpendicular to the axis of rotation of said rotatable member.

3. The improvement as defined in claim 1 wherein said guide member constrains said follower means to linear movement between its first and second positions.

4. The improvement as defined in claim 1 wherein said device further comprises:
   spring means urging said follower means toward its first position; and
   means for removing said follower means from engagement with said spiral cam surface after said shutter mechanism has moved to its cocked position, whereby said spring means may then move said follower means back to its first position.

5. The improvement as defined in claim 4 wherein said device further comprises means for preventing return of said follower means to its first position until the next successive frame of film has been indexed to said exposure station.

* * * * *